May 4, 1954 R. FONT 2,677,775

RETAINING FRAME PIEZOELECTRIC CRYSTAL MOUNTING

Filed Dec. 26, 1951 2 Sheets-Sheet 1

INVENTOR.
RAMON FONT
BY Herman L. Gordon
ATTORNEY

RETAINING FRAME PIEZOELECTRIC CRYSTAL MOUNTING

Filed Dec. 26, 1951 2 Sheets-Sheet 2

INVENTOR.
RAMON FONT
BY Herman L. Gordon
ATTORNEY

Patented May 4, 1954 2,677,775

UNITED STATES PATENT OFFICE 2,677,775

RETAINING FRAME PIEZOELECTRIC CRYSTAL MOUNTING

Ramón Font, Richmond Hill, N. Y., assignor, by mesne assignments, to Premier Research Laboratories Inc., New York, N. Y., a corporation of New York Application December 26, 1951, Serial No. 263,430

8 Claims. (Cl. 310—9.2)

This invention relates to crystal units, and more particularly to crystal units of the hermetically sealed type.

A main object of the invention is to provide a novel and improved hermetically sealed crystal unit which is simple in construction, which is easy to manufacture, and which has high activity.

A further object of the invention is to provide an improved crystal unit of the hermetically sealed type employing plated electrodes, said unit involving inexpensive components, being stable in frequency and activity over a wide temperature range, and being mechanically rugged in construction.

A still further object of the invention is to provide an improved crystal unit which is especially suited for mass production techniques, which provides a high degree of protection against mechanical injury to the crystal plate therein, and which provides positive electrical connections between its electrodes and the external contact terminals thereof.

Further objects and advantages of the invention will become apparent from the following description and claims, and from the accompanying drawings, wherein:

Figure 1:
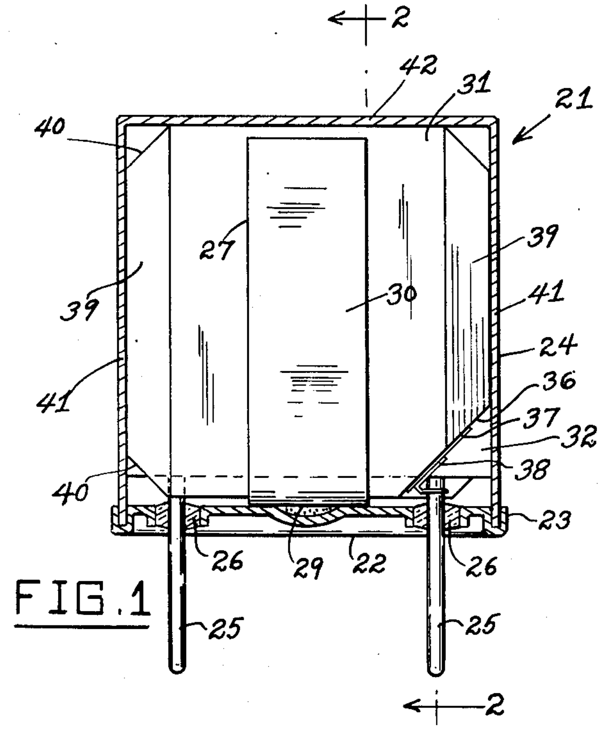
Figure 1 is a vertical cross-sectional view taken through one form of crystal unit constructed in accordance with the present invention.
Figure 2:
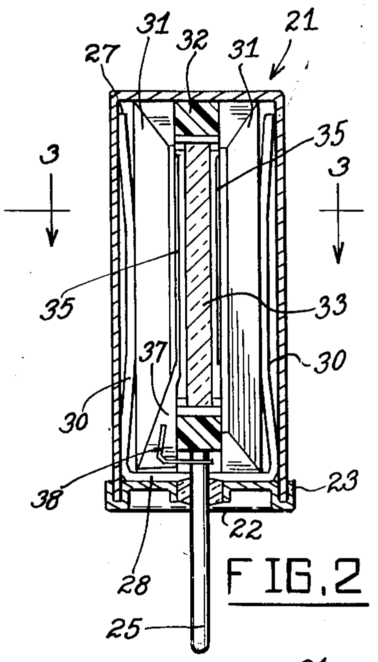
Figure 2 is a vertical cross-sectional view taken on line 2—2 of Figure 1.
Figure 3:
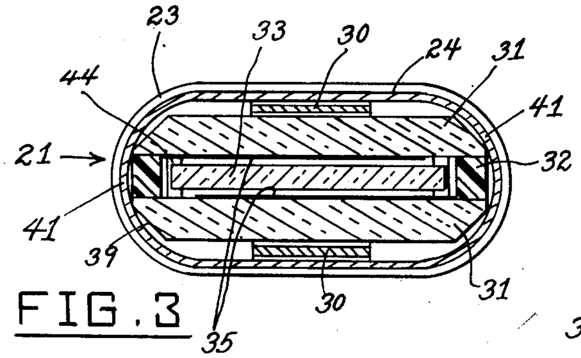
Figure 3 is a horizontal cross-sectional view taken on line 3—3 of Figure 2.
Figure 4:
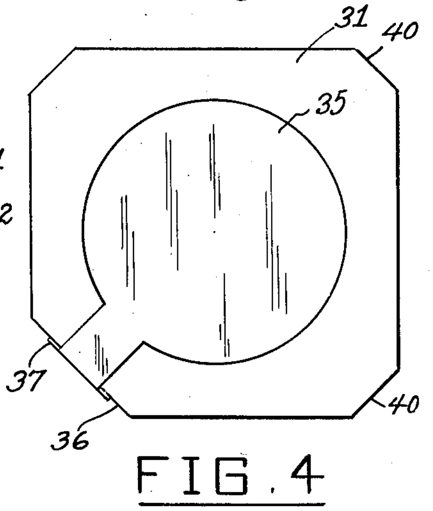
Figure 4 is an elevational detail view of one of the electrode-bearing insulating slabs employed in the crystal unit of Figures 1 to 3.
Figure 5:
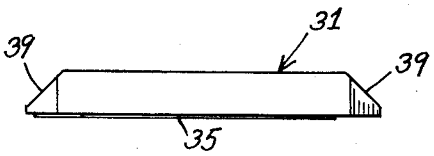
Figure 5 is a top view of the electrode-bearing slab of Figure 4.

Referring to the drawings, and more particularly to Figures 1 to 5, one form of improved crystal unit according to this invention is designated generally at 21. Said unit 21 comprises an elongated, generally oval base 22, formed around its periphery with an upwardly facing continuous channel 23 adapted to receive the bottom edges of a housing member 24, said bottom edges being sealingly secured in channel 23 in any suitable manner, as by soldering, or the like. Designated at 25, 25 are respective terminal prongs sealingly and insulatingly secured in the respective end portions of base 22, as by glass-to-metal seals, shown at 26, 26. The top ends of prongs 25 project a short distance above base 22, as shown in Figures 1 and 2.

Designated at 27 is a U-shaped leaf spring having the flat bight portion 28 which is transversely secured on the intermediate portion of base 22 by suitable fastening means, such as the solder joint 29. Spring 27 has the upstanding resilient side arms 30, 30, said side arms being inwardly bowed, as shown in Figure 2, and the end portions of said side arms being engaged by the housing member 24 to urge the bowed intermediate portions of said side arms inwardly.

Designated at 31, 31 are respective generally rectangular insulating slabs of any suitable insulating material, such as ceramic material, and designated at 32 is a generally rectangular spacer frame of insulating material, such as ceramic or plastic, which is interposed between the slabs 31, 31 and which rests on the top ends of prongs 25, 25. Disposed in the spacer frame is the crystal plate 33.

The spacer frame 32 is of greater thickness than the crystal plate 33, providing an air gap between the slabs 31, 31, and the crystal plate interposed therebetween. The upper corners of the spacer frame 32 are bevelled, as shown at 34, to facilitate the reception of said frame in the housing member 24.

Deposited on the inside major surface of each slab 31 is a plated electrode 35. Each slab 31 is formed with a large bevel at one lower corner, as shown at 36, and the respective electrode platings are extended around the respective bevels 36, to define soldering surfaces 37, adjacent the top ends of the respective contact terminals 25. Each surface 37 is connected to a contact terminal 25 by a short length of wire 38 soldered at its ends to the surface 37 and the top end of the adjacent contact terminal.

As shown in Figure 2, the slabs 31, 31 are positioned within the U-shaped leaf spring 27, and the inwardly bowed intermediate portions of the resilient arms 30 exert inward clamping force on said slabs.

The slabs 31 are preferably bevelled along their outer vertical edges, as shown at 39, and may be also bevelled at their corners, as shown at 40, to facilitate the reception of the slabs in the housing member 24, inasmuch as said housing member has the rounded ends 41, 41, and the side edges of the slabs are preferably substantially in engagement with the inside surfaces of said rounded ends to prevent endwise movement of the slabs relative to the housing member. The top ends of the slabs are similarly engaged by the top wall 42 of the housing member.

It will be seen that the large bevel 36 at the lower corner of each slab allows the plated surface 37 to be connected to the adjacent contact terminal by a very short length of wire 38, and that said wire is housed in the space defined by said bevel and requires no further insulation, since it is so short that it cannot come into contact with either base 22 or housing member 24.

Figure 6:
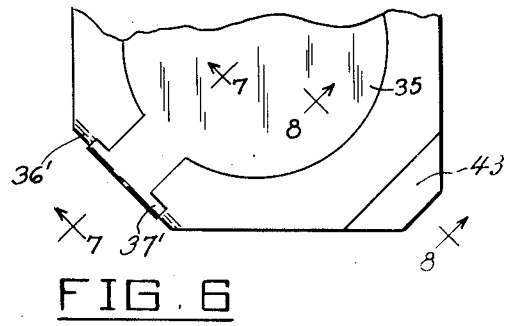
Figure 6 is a fragmentary elevational view of a modified form of electrode-bearing slab which may be employed in the crystal unit of Figures 1 to 3.
Figure 7:
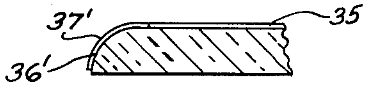
Figure 7 is a cross-sectional detail view taken on line 7—7 of Figure 6.
Figure 8:
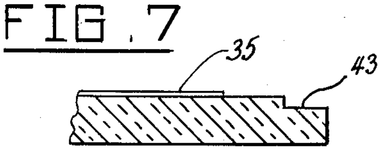
Figure 8 is a cross-sectional detail view taken on line 8—8 of Figure 6.
Figure 9:
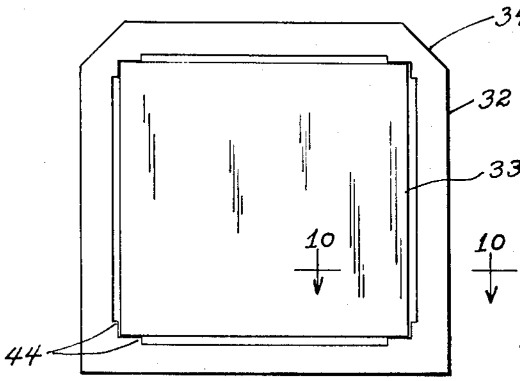
Figure 9 is an elevational detail view of the crystal plate-supporting spacer frame employed in the crystal unit of Figures 1 to 3.
Figure 10:
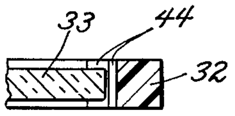
Figure 10 is a cross-sectional detail view taken on line 10—10 of Figure 9.

As shown in Figures 6, 7 and 8, the large bevel at the lower corner of each slab may be rounded, as indicated at 36′, whereby a rounded soldering surface 37′ may be provided thereon. The opposite lower corner of the slab may be recessed at its inner surface, as shown at 43, to increase the amount of clearance space adjacent the top ends of the respective contact prongs 25 when the elements are assembled on the base 22.

Referring to Figures 9 to 12, the spacer frame 32 may be formed at its inside corners with the rectangular steps 44, 44, defining right-angled notches therebetween to receive the corners of the crystal plate 33. By this arrangement, crystals of two different rectangular shapes may be engaged in the frame, since a substantially square crystal may be engaged in the aforesaid right angled notches, or an oblong crystal may be engaged in the rectangular space defined by the end shoulders of four selected steps 44 at the four corners of the frame.

Figure 11:
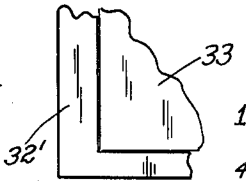
Figure 11 is a fragmentary elevational detail view similar to Figure 9, showing a modified form of spacer frame which may be employed in the crystal unit of Figures 1 to 3.

In Figure 11, the frame, designated at 32′, is formed to receive only one size of crystal plate 33, said frame having right-angled inside corners.

Figure 12:
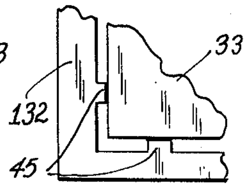
Figure 12 is a fragmentary elevational detail view showing another modified form of spacer frame which may be employed in the crystal unit of Figures 1 to 3.

In Figure 12, a modified form of frame, designated at 132, is illustrated, wherein rectangular lugs 45, 45 are provided at each inside corner of the frame, each lug 45 being located a short distance from the frame inside corner, as shown. The crystal plate 33 is engaged adjacent its respective corners by the respective pairs of rectangular lugs 45, 45, leaving the crystal corners free to vibrate. As in the frame illustrated in Figure 9, at least two different sizes of crystal plate may be mounted in the frame, since the inside end shoulders of two opposing pairs of lugs 45 may be employed to define a rectangular crystal-retaining space.

Figures 13, 14:
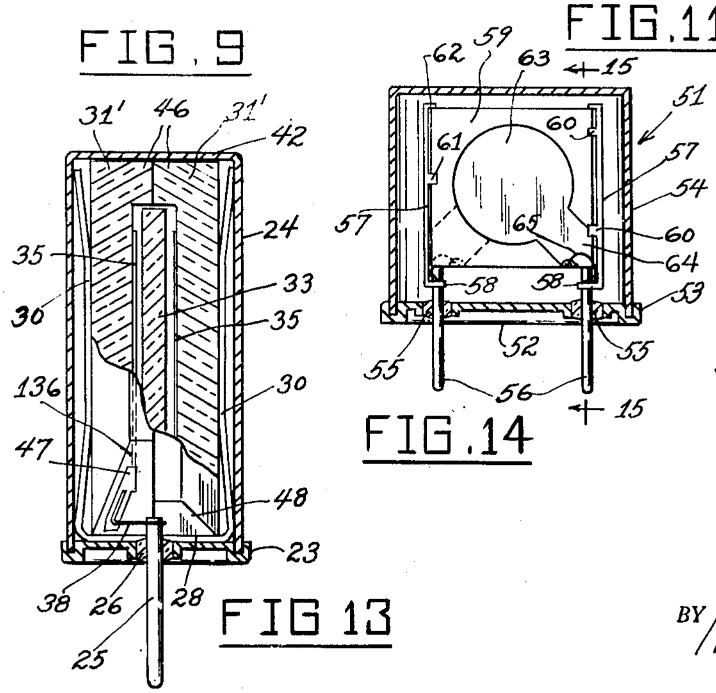
Figure 13 is a vertical cross-sectional view similar to Figure 2, showing a modified form of crystal unit according to the present invention wherein the electrode spacer elements are formed integrally with the electrode-bearing slabs and define a complete internal enclosure around the crystal plate.
Figure 14 is a vertical cross-sectional view taken through another form of crystal unit according to the present invention.

Referring now to Figure 13, a modified form of assembly is illustrated wherein the crystal plate spacer means is formed integral with the electrode-bearing slabs, designated at 31′, 31′. Each slab 31′ is formed with the continuous inwardly projecting abutment flange 46, whereby a crystal plate-receiving cavity is defined when the slabs are brought together, as shown. A metal ribbon 47 may be molded in each slab, said ribbon extending through the peripheral flange 46 at the large bevel, shown at 136. The plated electrode 35 may be connected to the inside end of the metal ribbon 47 in any suitable manner. The connecting wire 38 may be soldered at one end to the metal ribbon 47 and at its other end to the top end of the adjacent prong 25. The opposite lower corner of each slab is provided with a smaller bevelled surface 48 which supportingly engages the top end of the terminal prong 25 at said opposite lower corner. The concave slabs 31′ are clamped together by the spring arms 30, 30, with the crystal plate 33 retained in the cavity between the slabs. The slabs are supported and properly positioned vertically by the engagement of their bevelled corners 48 with the top ends of the contact prongs 25 and are supported at their intermediate portions by the bight portion 28 of the U-shaped leaf spring 27.

Figure 15:
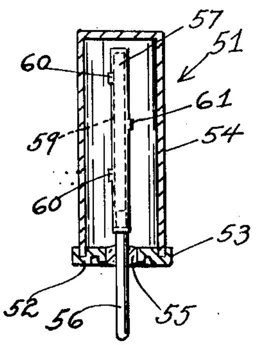
Figure 15 is a vertical cross-sectional view taken on line 15—15 of Figure 14.

Referring now to Figures 14 and 15, a further form of the invention is illustrated. The crystal unit is designated generally at 51 and comprises a base 52 having the upwardly facing peripheral channel 53 in which the bottom rim of the housing member 54 is received and is sealingly secured, as by soldering or the like. Extending sealingly through the opposite end portions of the base 52, as by glass-to-metal seals 55, 55, are the contact prongs 56, 56. Designated at 57, 57 are opposing bar members formed at their lower ends with apertured lugs 58, 58 engaged over and soldered to the upper portions of the prongs 56, 56, as shown. Designated at 59 is a rectangular crystal plate which is loosely positioned between the opposing bar members 57, 57 and which rests on the top ends of the prongs 56, 56. The bar members 57 are each provided on one side with the spaced inwardly projecting marginal lugs 60, 60, loosely engaging the margin of one side of the crystal plate, and on its other side with the intermediate inwardly projecting marginal lug 61 loosely engaging the margin of the other side of the crystal plate at a location intermediate the lugs 60, 60. Each bar member is provided at its top end with an inwardly projecting lug 62 overlying a top corner of the crystal plate. The crystal plate is thus substantially retained in a stationary position and the retaining means therefor is supported on the top end portions of the prongs 56, 56.

Each major face of the crystal plate is provided with a plated electrode 63 having an extension 64 directed toward and extending under a lower corner of the crystal plate. Each extension 64 is connected by a short wire 65 to the soldered connection of the adjacent lug 58 to the upper portion of its associated prong 56.

While certain specific embodiments of an improved heremetically sealed crystal unit have been disclosed in the foregoing description, it will be understood that various modifications within the spirit of the invention may occur to those skilled in the art. Therefore it is intended that no limitations be placed on the invention except as defined by the scope of the appended claims.

What is claimed is:

1. In a crystal unit, a base, a pair of contact terminals extending through and secured in said base, a crystal plate arranged over said terminals, respective electrodes at opposite sides of the plate connected to said terminals, a retaining frame disposed between said electrodes and surrounding said crystal plate, said frame being supported directly on and being substantially in the plane of said terminals, a housing disposed over the electrodes and secured to said base, and resilient clamping means between said housing and the electrodes.

2. In a crystal unit, a base, a pair of contact terminals extending through and secured in said base, a crystal plate arranged over said terminals, respective electrodes at opposite sides of the plate connected to said terminals, a retaining frame disposed between said electrodes and surrounding said crystal plate, said frame being supported directly on and being substantially in the plane of said terminals, a housing disposed over the electrodes and secured to said base, and a U-shaped leaf spring secured on said base and receiving said electrodes, said housing engaging the arms of said leaf spring and tensioning said arms inwardly against the electrodes.

3. The structure of claim 1, and wherein said clamping means comprises a U-shaped leaf spring secured on said base and receiving said electrodes, said leaf spring having outwardly concave resilient arms and the housing engaging said arms and tensing said arms inwardly against the electrodes.

4. The structure of claim 1, and wherein each electrode is cut away at one lower corner thereof adjacent the top end of one of the contact terminals.

5. In a crystal unit, a base, a pair of contact terminals extending through and secured in said base, a crystal plate arranged over said terminals, respective slabs of insulating material on opposite sides of the plate, said slabs having respective plated electrodes thereon, said electrodes being connected to said terminals, a retaining frame disposed between said slabs and surrounding said crystal plate, said frame being supported directly on and being substantially in the plane of said terminals, a housing disposed over the slabs and secured to said base, and resilient clamping means between said housing and the slabs.

6. The structure of claim 5, and wherein each slab is cut away at one lower corner thereof adjacent the top end of one of the contact terminals.

7. In a crystal unit, a base, a pair of parallel contact prongs extending through and secured in said base, a crystal plate arranged over said prongs, respective substantially rectangular slabs of insulating material at opposite sides of the plate, respective plated electrodes on the slabs facing the crystal plate, spacer means between the slabs engaging the marginal edges of the crystal plate and holding said plate between the electrodes, said spacer means being supported directly on the prongs, means connecting the electrodes to the respective prongs, a housing disposed over said slabs and secured to said base, and resilient clamping means between said housing and the outer major faces of the slabs.

8. The structure of claim 7, and wherein each slab is cut away at a lower corner thereof adjacent the top end of a contact prong, and the respective connecting means extend around the cut away lower corners of the slabs.

References Cited in the file of this patent

UNITED STATES PATENTS

| Number | Name | Date |
|---|---|---|
| 1,959,827 | Hyland | May 22, 1934 |
| 2,273,711 | Klein | Feb. 17, 1942 |
| 2,392,690 | Perkins | Jan. 8, 1946 |
| 2,404,445 | Kuenstler | July 23, 1946 |
| 2,408,768 | Fox | Oct. 8, 1946 |
| 2,425,481 | Morse | Aug. 12, 1947 |
| 2,430,478 | Nelson | Nov. 11, 1947 |
| 2,454,244 | Wintermute | Nov. 16, 1948 |
| 2,482,451 | Adams | Sept. 20, 1949 |
| 2,482,661 | Dimmick | Sept. 20, 1949 |
| 2,484,004 | Adams | Oct. 4, 1949 |
| 2,486,547 | Bach | Nov. 1, 1949 |
| 2,509,478 | Caroselli | May 30, 1950 |
| 2,542,651 | Franklin | Feb. 20, 1951 |

FOREIGN PATENTS

| Number | Country | Date |
|---|---|---|
| 560,644 | Great Britain | Apr. 13, 1944 |
| 757,044 | France | Dec. 19, 1933 |
| 911,761 | France | July 19, 1946 |